Dec. 6, 1932.   R. B. SPIKES   1,889,814
AUTOMATIC GEAR SHIFT
Filed March 31, 1931   2 Sheets-Sheet 1
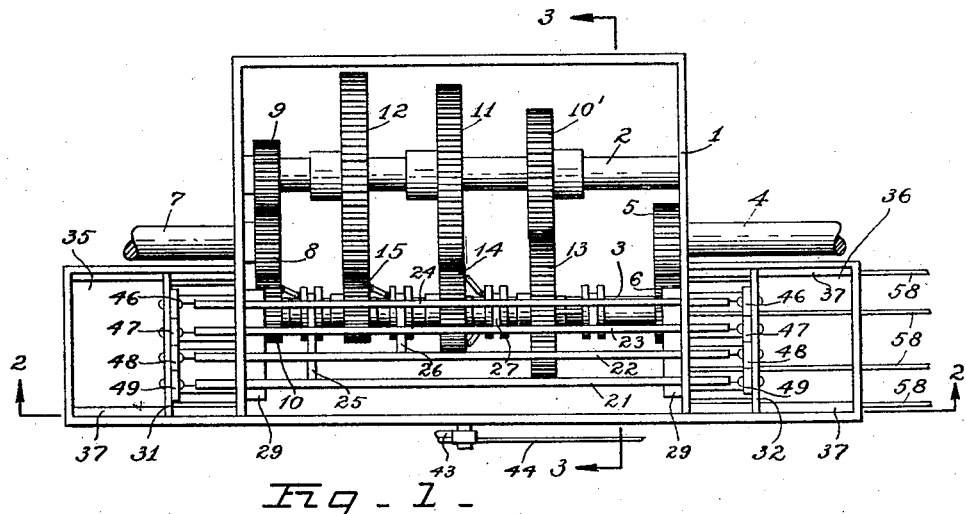
INVENTOR
RICHARD B. SPIKES.
BY
Munn & Co.
ATTORNEYS.

Dec. 6, 1932.                R. B. SPIKES                1,889,814
                          AUTOMATIC GEAR SHIFT
                  Filed March 31, 1931        2 Sheets-Sheet 2

INVENTOR.
RICHARD B. SPIKES.
BY  Munn & Co.
        ATTORNEYS.

Patented Dec. 6, 1932

1,889,814

UNITED STATES PATENT OFFICE

RICHARD B. SPIKES, OF SAN FRANCISCO, CALIFORNIA

AUTOMATIC GEAR SHIFT

Application filed March 31, 1931. Serial No. 526,725.

My invention relates to improvements in automatic gear shifts and it consists of the combinations, constructions and arrangements hereinafter described and claimed.

An object of my invention is to provide an automatic gear shift in which the gears for the various speeds are constantly in mesh and in which novel clutch mechanisms are used for connecting any desired set of gears with the drive and driven shafts.

A further object of my invention is to provide a device of the type described in which the driver can manipulate levers representing the various speeds, these levers being mechanically or otherwise connected to mechanism which will throw in the clutch of the desired gear train, the clutch operatively connecting the drive and driven shafts together when the automobile clutch pedal is depressed. In this way the driver merely has to actuate the lever for the speed desired and then depress the automobile clutch pedal, whereupon the drive and driven shafts will be automatically connected together at the desired gear ratio. Since the various sets of gears are constantly in mesh there will be no clashing of gears when shifting from speed to speed and this makes the transmission silent in operation.

Other objects and advantages will appear in the following specification, and the novel features of the device will be particularly pointed out in the appended claim.

My invention is illustrated in the accompanying drawings, forming a part of this application, in which Figure 1 is a top plan view of the device;

Figure 2 is a section along the line 2—2 of Figure 1;

Figure 8 shows a diagrammatic view of the transmission used in an automobile.

Figure 3:
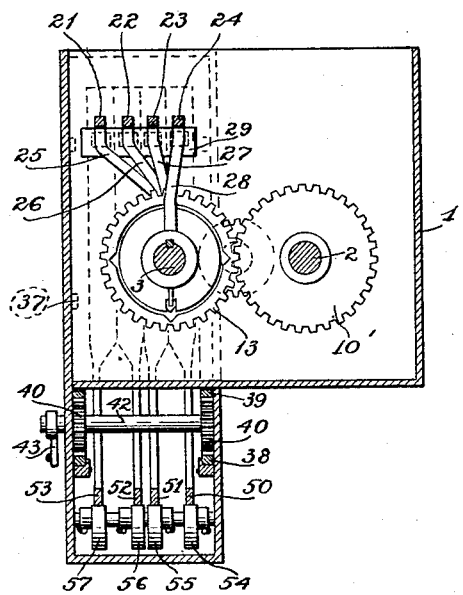
Figure 3 is a section along the line 3—3 of Figure 1.

In carrying out my invention I provide a transmission housing 1 in which an auxiliary shaft 2 and a clutch shaft 3 are rotatably mounted. A drive shaft 4 leading from the engine not shown enters the housing 1 and has a gear 5 meshing with a gear 6, the latter being mounted upon the clutch shaft 3 (see Figures 1 and 2). A driven shaft 7 enters the housing 1 and has a gear 8 meshing with a gear 9 mounted on the auxiliary shaft 2 and with a gear 10 loosely mounted on the clutch shaft 3 for reverse speed.

The shafts 2 and 3 carry sets of gears representing different forward speeds. On the shaft 2, for example, gears 10', 11 and 12 are rigidly secured. On the shaft 3 gears 13, 14 and 15 are rotatably mounted. The gears 13, 14 and 15 are in mesh with the gears 10', 11 and 12 respectively at all times.

Figure 5:
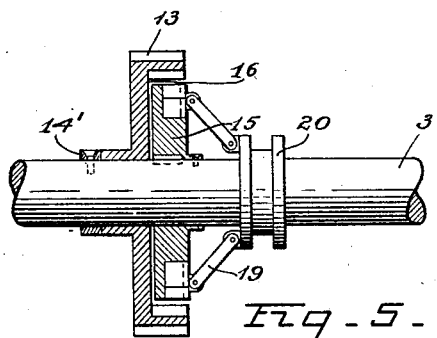
Figure 5 is a sectional view through one of the clutches used in the gear trains.
Figure 6:
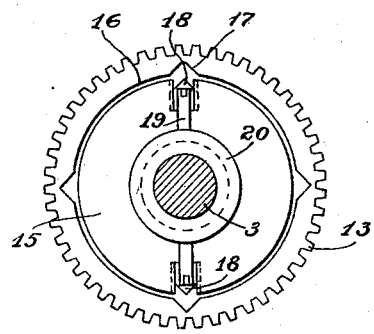
Figure 6 is an end view of Figure 5.

It is best now to describe the means whereby any one of the gears 10, 13, 14 and 15 may be connected to the clutch shaft 3 so as to be rotated by the shaft. The clutch for accomplishing this is exactly the same for each one of the gears 10, 13, 14 and 15 and therefore a description of one will suffice. In Figures 5 and 6 I show the clutch shaft 3 and the gear 13 rotatably mounted on the shaft. A ring 14' prevents longitudinal movement of the gear 13 in one direction on the shaft. A clutch member 15 is secured to the shaft 3 and is disposed in a recess 16 in the gear 13. The recess has a plurality of notches or indentations 17 (see Figure 6). The member 15 carries locking dogs 18 which are movable outwardly in a radial direction by links 19 when a collar 20 is moved to the left in Figure 5. The member 15 is rotatable with the shaft 3 and the outward movement of the dogs 18 causes them to enter the indentations 17 and to lock the gear 13 so as to rotate it with the member 15. In this way the gear 13 is connected directly to the shaft 3. The other gears 10, 14 and 15 are connectable to the shaft 3 in the same way.

I will now describe the means for moving the collars 20. In Figure 3 it will be noted that four bars, 21, 22, 23 and 24 carry depending forks 25, 26, 27 and 28 respectively, these forks being received by the collars 20 (see Figure 1). Figure 2 shows how the rods 21 to 24 inclusive are slidably supported by projections 29 and how the rods pass through openings 30 in the end walls of the transmission housing 1. The rods are normally disposed in the position shown in Figures 1 and 2 and when in this position the clutches are disengaged from the gears 10, 13, 14 and 15.

Figure 4:
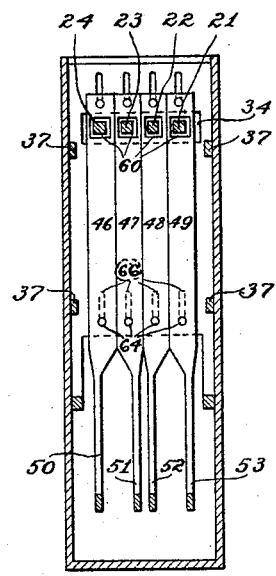
Figure 4 is a section along the line 4—4 of Figure 2.

Reference to Figure 2 shows the rod moving members 31 and 32 that have openings 33 and 34 for the passage of the rods therethrough. Figure 1 shows how the members 31 and 32 are slidably mounted in compartments 35 and 36 and Figures 2 and 4 show how these compartments have guide rails 37 for holding the members 31 and 32 in vertical position while permitting their movement in a horizontal plane. The member 31 has a rack 38 and the member 32 has a rack 39 that mesh with a gear 40. The racks and gear are disposed beneath the bottom 41 of the transmission housing 1. Figures 1 and 2 show how the gear 40 is mounted on a shaft 42 which in turn has an arm 43 that is connected by a link 44 (see Figure 8) to the clutch pedal 45 of the automobile. It will be seen from this construction that a depressing of the clutch pedal 45 will rotate the gear 40 for moving the members 31 and 32 toward each other and that a releasing of the clutch pedal will cause the members to return to the positions shown in Figures 1 and 2.

The member 31 carries a plurality of what I choose to call gates 46, 47, 48 and 49. These gates are connected to similarly numbered gates carried by the member 32. The gates 46 for example, are designed to register with the rod 24 and in like manner the gates 47 register with the rod 23 and the gates 48, and 49 register with the rods 22 and 21 respectively (see Figure 1). The gates of each set are connected together by cross members 50, 51, 52 and 53 (see Figures 2 and 3) each of these members having telescoping sections A and B, and these cross members rest upon eccentrics 54, 55, 56 and 57. The eccentrics are actuated by any suitable means, such as the mechanism shown in Figure 8 which comprises links 58 operatively connected to actuating levers 59.

When the parts are in normal position the gates 46 to 49 inclusive carried by the member 32 have their openings 60 registering with the opening 34 while their corresponding gates on the member 31 have their openings 61 disposed out of registration with the opening 33. If now the lever 59 associated with the eccentric 57 is actuated, the cross bar 53 will be raised, which will lift the gates 46 and move the opening 60 out of registration with the opening 34 and move the opening 61 into registration with the opening 33. If now the clutch pedal 45 is depressed the movement of the members 31 and 32 toward each other will permit the rods 22, 23 and 24 to pass through the openings 60 and 34 while the rod 21 will be engaged by the gate 49 on the member 32 and will be moved to the left for causing its arm 25 to connect the gear 10 with the shaft 3. Such a connection is equivalent to shifting into reverse speed.

I have shown a plurality of levers 59 disposed adjacent to the steering wheel 63 of the automobile and each one of these levers is mechanically connected to its associate link 58. If the operator wishes to shift from one speed which has just been explained into another, he moves the appropriate lever 59 which actuates its associate link 58, and causes it to rock the cam 56 which raises the cross bar 52 and brings the opening 60 of the gate 48 out of registration with the opening 34 and further brings the opening 61 of the associate gate into registration with the opening 33. It should be remembered that the gates 49 have previously been lowered into their normal positions due to a spring 62 returning the link 58 to normal position.

The pressing of the clutch pedal 45 will now cause the members 31 and 32 to move toward each other and during this movement the gate 49 carried by the member 31 will move the rod 21 back into normal position and free the clutch connected with the gear 10. At the same time the gate 48 on the member 32 will engage the rod 22 and cause its fork 26 to connect the gear 15 with the shaft 3. In this way a silent shifting from reverse speed into another speed is accomplished.

It should be remembered that during the shifting from one speed to another the clutch pedal 45 is depressed and this disconnects the engine not shown from the driving shaft 4. There will therefore be no clashing of gears nor a sudden change in speed of the automobile when shifting from one gear ratio to another. The silent shifting is accomplished because the gears of each gear train are always in mesh with each other.

Figure 7:
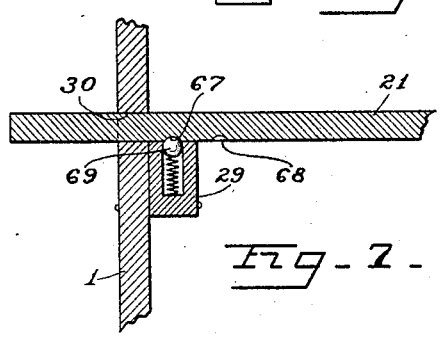
Figure 7 is a sectional view through another part of the device.

It will be noted that the gates 46 to 49 inclusive are slidably secured to the members 31 and 32 by rivets 64, the rivets sliding in slots 65 and 66 in the members 31 and 32 when the gates are moved upwardly. In Figure 7 I show the means for yieldingly holding the rods 21 to 24 inclusive in adjusted position. The rod 21 shown in this figure is provided with two recesses 67 and 68 and a spring-pressed ball 69 disposed in the support 29 enters either one of the recesses 67 and 68 and prevents accidental movement of the rod 21. The rod 21 has two sets of recesses 67 and 68 and each support 29 carries a spring-pressed ball (see Figure 2).

Although I have shown and described one embodiment of our invention it is to be understood that the same is susceptible of various changes and we reserve the right to employ such changes as may come within the scope of the claim hereto annexed.

I claim:

In combination, a plurality of clutch actuating members, a rod for each member, a rod shifting device having an opening for receiving the rods, a gate for each rod, selective means for moving any one of the gates to cover a portion of the opening, and means for moving the rod shifting device for moving the desired clutch actuating member; a second rod shifting device having an opening for the passage of rods therethrough, a second gate for each rod and normally closing the opening in the second rod shifting device, the gates in the first and second sets disposed opposite the same rod being operatively connected together, whereby the closing of the opening in the first rod shifting device by one of the first named gates will cause its associate gate to uncover a portion of the opening in the second rod shifting device, said second rod shifting device being moved by the same means actuating the first rod shifting device and returning all clutch actuating members not actuated by the first device, to normal position.

RICHARD B. SPIKES.